United States Patent
Bouazizi et al.

(10) Patent No.: US 11,381,622 B2
(45) Date of Patent: *Jul. 5, 2022

(54) METHOD AND APPARATUS FOR MEDIA DATA DELIVERY CONTROL

(71) Applicant: Samsung Electronics Co., Ltd., Suwon-si (KR)

(72) Inventors: Imed Bouazizi, Plano, TX (US); Youngkwon Lim, Plano, TX (US); Kong Posh Bhat, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

This patent is subject to a terminal disclaimer.

(21) Appl. No.: 16/538,735

(22) Filed: Aug. 12, 2019

(65) Prior Publication Data

US 2019/0364082 A1    Nov. 28, 2019

Related U.S. Application Data

(63) Continuation of application No. 15/149,001, filed on May 6, 2016, now Pat. No. 10,382,515, which is a (Continued)

(51) Int. Cl.
*H04L 29/06* (2006.01)
*H04N 21/44* (2011.01)
(Continued)

(52) U.S. Cl.
CPC .......... *H04L 65/604* (2013.01); *H04L 1/0045* (2013.01); *H04L 49/9005* (2013.01);
(Continued)

(58) Field of Classification Search
CPC . H04L 65/604; H04L 1/0045; H04L 49/9005; H04L 65/4084; H04L 65/602;
(Continued)

(56) References Cited

U.S. PATENT DOCUMENTS 5,566,208 A * 10/1996 Balakrishnan ... H04N 21/23406
370/468
6,577,621 B1   6/2003 Balachandran
(Continued)

FOREIGN PATENT DOCUMENTS

CN    1669290 A    9/2005
CN  101040475 A    9/2007
(Continued)

OTHER PUBLICATIONS

Riley et al, Low Latency Video Communications over High Bandwidth-Delay Networks using FEC; Published in: IEEE Colloquium on Time Critical Data Communications (pp. 3/1-3/9), Jan. 1, 1994 (Year: 1994).*

(Continued)

*Primary Examiner* — Yaotang Wang (57) ABSTRACT

A method and apparatus control receiving media data in a transmission system. A method of operating a receiving entity in the transmission system includes receiving packets for media data and information about a fixed delay associated with the media data. The method also includes identifying a requirement configured to guarantee that the packets for the media data are delivered to an upper layer of the receiving entity after the fixed delay, from the information about the fixed delay. The method further includes identifying a buffer size requirement for the receiving entity estimated based on the fixed delay and bitrate information associated with the media data; and delivering the packets to the upper layer of the receiving entity.

4 Claims, 4 Drawing Sheets

Related U.S. Application Data continuation of application No. 14/049,022, filed on Oct. 8, 2013, now Pat. No. 10,356,143.

(60) Provisional application No. 61/712,045, filed on Oct. 10, 2012.

(51) Int. Cl.

| | | |
|---|---|---|
| *H04N 21/643* | (2011.01) | |
| *H04N 21/854* | (2011.01) | |
| *H04L 1/00* | (2006.01) | |
| *H04L 12/861* | (2013.01) | |
| *H04N 21/438* | (2011.01) | |
| *H04L 65/60* | (2022.01) | |
| *H04L 65/612* | (2022.01) | |
| *H04L 65/80* | (2022.01) | |
| *H04L 49/9005* | (2022.01) | |

(52) U.S. Cl.
CPC .......... *H04L 65/4084* (2013.01); *H04L 65/60* (2013.01); *H04L 65/602* (2013.01); *H04L 65/80* (2013.01); *H04N 21/44004* (2013.01); *H04N 21/64322* (2013.01); *H04N 21/85406* (2013.01); *H04N 21/4381* (2013.01)

(58) Field of Classification Search
CPC ... H04L 65/80; H04L 65/60; H04N 21/44004; H04N 21/64322; H04N 21/85406; H04N 21/4381

See application file for complete search history.

(56) References Cited

U.S. PATENT DOCUMENTS

| | | | |
|---|---|---|---|
| 2002/0009054 | A1 | 1/2002 | Suzuki et al. |
| 2003/0152052 | A1 | 8/2003 | Kekki et al. |
| 2004/0012510 | A1 | 1/2004 | Chen |
| 2004/0057446 | A1 | 3/2004 | Varsa et al. |
| 2004/0117858 | A1 | 6/2004 | Boudreau et al. |
| 2004/0240438 | A1 | 12/2004 | Grossman |
| 2005/0120130 | A1 | 6/2005 | Ohkawa |
| 2005/0237937 | A1 | 10/2005 | Van Gestel |
| 2005/0254508 | A1 | 11/2005 | Aksu et al. |
| 2006/0007960 | A1 | 1/2006 | Liu et al. |
| 2006/0045138 | A1 | 3/2006 | Black et al. |
| 2006/0104279 | A1 | 5/2006 | Fellman et al. |
| 2006/0107189 | A1 | 5/2006 | Wenger et al. |
| 2006/0112272 | A1 | 5/2006 | Morioka et al. |
| 2006/0253600 | A1 | 11/2006 | Hannuksela |
| 2006/0291386 | A1 | 12/2006 | Jyske et al. |
| 2007/0249287 | A1 | 10/2007 | Das et al. |
| 2007/0253449 | A1 | 11/2007 | Das et al. |
| 2008/0049789 | A1 | 2/2008 | Vedantham et al. |
| 2009/0016299 | A1 | 1/2009 | Watanabe et al. |
| 2009/0129375 | A1 | 5/2009 | Mohanty et al. |
| 2009/0168791 | A1 | 7/2009 | Hamamoto |
| 2010/0046634 | A1 | 2/2010 | Dai et al. |
| 2010/0149976 | A1 | 6/2010 | Lee |
| 2010/0260180 | A1 | 10/2010 | Wu et al. |
| 2011/0002269 | A1 | 1/2011 | Ranta-Aho et al. |
| 2011/0010625 | A1 | 1/2011 | Pettersson et al. |
| 2011/0145161 | A1 | 6/2011 | Scarborough et al. |
| 2011/0252265 | A1 | 10/2011 | Iwami et al. |
| 2011/0252287 | A1* | 10/2011 | Kure ...................... H04N 19/63 714/758 |
| 2012/0036277 | A1 | 2/2012 | Stokking et al. |
| 2012/0185907 | A1 | 7/2012 | Park et al. |
| 2012/0324520 | A1 | 12/2012 | Van Deventer et al. |
| 2013/0100948 | A1 | 4/2013 | Irvine |

FOREIGN PATENT DOCUMENTS

| | | |
|---|---|---|
| CN | 101151829 A | 3/2008 |
| CN | 101228748 A | 7/2008 |
| CN | 101341778 A | 1/2009 |
| CN | 101536532 A | 9/2009 |
| CN | 101584221 A | 11/2009 |
| CN | 101656682 A | 2/2010 |
| CN | 101861709 A | 10/2010 |
| CN | 102215319 A | 10/2011 |
| CN | 102215402 A | 10/2011 |
| CN | 102356619 A | 2/2012 |
| EP | 2343845 A2 | 7/2011 |
| JP | 2002281077 A | 9/2002 |
| JP | 2005184580 A | 7/2005 |
| JP | 2006500797 A | 1/2006 |
| JP | 2011023992 A | 2/2011 |
| JP | 2012-70322 A | 4/2012 |
| KR | 10-2012-0103750 A | 9/2012 |
| RU | 2364040 C2 | 8/2009 |
| WO | 2004055990 A2 | 7/2004 |
| WO | 2008110916 A2 | 9/2008 |
| WO | 2009152396 A2 | 12/2009 |
| WO | 2012077353 A1 | 6/2012 |
| WO | 2012099429 A2 | 7/2012 |

OTHER PUBLICATIONS

International Search Report dated Jan. 23, 2014 in connection with International Patent Application No. PCT/KR2013/009049, 7 pages.
Written Opinion of International Searching Authority dated Jan. 23, 2014 in connection with International Patent Application No. PCT/KR2013/009049, 5 pages.
Extended European Search Report issued for EP 13845741.1 dated Apr. 21, 2016, 11 pgs.
Bouazizi et al., "Hypothetical Receiver Buffer Model for MMT", ISO/IEC JTC1/SC29/WG11, MPGEG2012/M27103, XP030055414, Oct. 10, 2012, 4 pgs.
Park et al., "Study of ISO/IEC CD 23008-1 MPEG Media Transport-Editors' Proposed Update of MMT Study of CD", ISO/IEC JTC1/SC29/WG11 MPEG/N13089, XP030055920 Jan. 22, 2013, 126 pgs.
ISO.org, "Information technology—High efficiency coding and media delivery in heterogeneous environments—Part 1: MPEG media transport (MMT)", XP008179243, ISO/IEC CD 23008-1, Jul. 20, 2012, 69 pgs.
Nokia, "Change Request to TM-CBMS 1167: Content Delivery Protocols for Ip Datacast Over DVB-H, v0.0.6—Hypothetical Receiver Buffering Model", XP017804263, Aug. 2005, 5 pgs.
Kondrad et al., "Optimizing the DVB-T2 System for Mobile Broadcast", 2010 IEEE International Symposium, XP031675557, Mar. 24, 2010, 5 pgs.
Nokia, "Hypothetical Receiver Buffer Model for IP Profile of the DVB-NGH System", DVB Organization: "TM-NGH1254r2-HpotheticalReceiverBufferModel--r2.docx", XP017838160, Feb. 3, 2012, 9 pgs.
Sung Hei Kim et al., "C.2 Layer Signaling Parameters for Reception Quality Feedback in MMT Service", ISO/IEC JTC1/SC29/WG11, XP030053493, MPEG2012/M 25150, May 3, 2012, 6 pgs.
Russian Office Action for PCT Application No. PCT/KR2013/009049, dated Dec. 22, 2016.
English translation of Russian Office Action for PCT Application No. PCT/KR2013/009049, dated Dec. 22, 2016.
Communication from a foreign patent office in a counterpart foreign application, Text of Notification of Reason for Rejection, Japanese Application No. 2015-536713, dated Nov. 28, 2017, 16 pages.
Communication from a foreign patent office in a counterpart foreign application, Text of the Second Office Action, Chinese Application No. 2013800530980, dated Dec. 13, 2017, 14 pages.
USPTO, Non-final Office Action, U.S. Appl. No. 15/149,001, dated Jan. 12, 2018, 33 pages.
Korean Intellectual Property Office Notification of Reasons for Rejection regarding Application No. 10-2015-7012135, dated Aug. 8, 2019, 16 pages.
China National Intellectual Property Administration, The First Office Action regarding Application No. 201910189779.9, dated Feb. 2, 2021, 11 pages.

(56) References Cited

OTHER PUBLICATIONS

China National Intellectual Property Administration, The First Office Action regarding Application No. 201910189780.1, dated Feb. 5, 2021, 13 pages.

* cited by examiner

METHOD AND APPARATUS FOR MEDIA DATA DELIVERY CONTROL

CROSS-REFERENCE TO RELATED APPLICATIONS

This application is a continuation of U.S. patent application Ser. No. 15/149,001, filed May 6, 2016, which is a continuation of U.S. patent application Ser. No. 14/049,022, filed Oct. 8, 2013, now U.S. Pat. No. 10,356,143, which claims priority under 35 U.S.C. § 119(e) to U.S. Provisional Patent Application No. 61/712,045, filed Oct. 10, 2012, the disclosures of which are herein incorporated by reference in their entirety.

TECHNICAL FIELD

The present application relates generally to media data delivery in a transmission system and, more specifically, to control the delivery and presentation of the media data.

BACKGROUND

Moving Picture Experts Group (MPEG) media transport (MMT) is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

MMT is designed under the assumption that the coded media data will be delivered through a packet-based delivery network using Internet Protocols (IPs), such as real-time transport protocol (RTP), transmission control protocol (TCP), user datagram protocol (UDP), etc. MMT is also designed with consideration for characteristics of different delivery environments. For example, the end-to-end delay of delivery of each packet from a sending entity to a receiving entity may not always be constant, and the underlying network providers must provide a way to distinguish signaling messages from the media data. Accordingly, there is a need for improved standards in MMT media data delivery.

SUMMARY

Embodiments of the present disclosure provide a method and apparatus for controlling delivery of media data in a transmission system.

In one embodiment, a method of operating a receiving entity in a transmission system is provided. The method includes receiving packets for media data and information about a fixed delay associated with the media data. The method also includes identifying a requirement configured to guarantee that the packets for the media data are delivered to an upper layer of the receiving entity after the fixed delay, from the information about the fixed delay. The method further includes identifying a buffer size requirement for the receiving entity estimated based on the fixed delay and bitrate information associated with the media data; and delivering the packets to the upper layer of the receiving entity.

In one embodiment, an apparatus in a receiving entity in a transmission system is provided. The apparatus includes a receiver configured to receive packets for media data and information about a fixed delay associated with the media data. The apparatus also includes a controller. The controller is configured to identify a requirement configured to guarantee that the packets for the media data are delivered to an upper layer of the receiving entity after the fixed delay, from the information about the fixed delay. The controller also is configured to identify a buffer size requirement for the receiving entity estimated based on the fixed delay and bitrate information associated with the media data. The controller further is configured to deliver the packets to the upper layer of the receiving entity.

In one embodiment, a method of operating a sending entity in a transmission system is provided. The method includes transmitting, to a receiving entity, packets for media data and information about a fixed delay associated with the media data. The method also transmitting information about a requirement, the requirement configured to guarantee that the packets for the media data are delivered to an upper layer of the receiving entity after the fixed delay, from the information about the fixed delay, wherein the fixed delay and bitrate information associated with the media data are configured to be used to identify a buffer size requirement for the receiving entity.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

MMT coding and media delivery is discussed in the following document and standards description: ISO/IEC JTC 1/SC29/WG11, High efficiency coding and media delivery in heterogeneous environments—Part 1: MPEG Media Transport (MMT), July 2012, which is hereby incorporated into the present disclosure as if fully set forth herein. For efficient and effective delivery of coded media data over heterogeneous IP network environments, MMT provides: a logical model to construct a content composed of various components for mash-up applications; the structure of data conveying information about the coded media data for the delivery layer processing, such as packetization and adaptation; a packetization method and packet structure to deliver media content agnostic to a specific type of media or coding method used over TCP or UDP, including hybrid delivery; a format of signaling messages to manage presentation and delivery of media content; a format of signaling messages to manage presentation and delivery of media content; a format of information to be exchanged across the layers to facilitate cross layer communication.

MMT defines three functional areas including encapsulation, delivery, and signaling. The encapsulation functional area defines the logical structure of media content, the MMT package, and the format data units to be processed by an MMT compliant entity. An MMT package specifies components including media content and the relationship among the media content to provide information needed for adaptive delivery. The format of the data units is defined to encapsulate the coded media to either be stored or carried as a payload of a delivery protocol and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package, and messages for delivery management are used to signal the structure of payload format and configuration of the protocol.

MMT defines a new framework for delivery of time continuous multimedia, such as audio, video, and other static content, such as widgets, files, etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

Embodiments of the present disclosure recognize that environmental conditions for receipt of media data may differ based on the transmission path, transmission formats, and the types of recipient devices resulting in delay between transmission and delivery (e.g., end-to-end delay). For example, different transmission media (e.g., wireless data communication (LTE, HSPA, 3G, WiFi, etc.), physical media (e.g., wireline, cable, Ethernet, optical fiber, etc.) satellite broadcast, etc.) have different associated transmission delays. Embodiments of the present disclosure recognize that, in addition to transmission delay, other sources may result in jitter. For example, forward error correction (FEC) decoding may insert additional delay to enable the recovery of lost packets, which requires receipt of sufficient source and parity packets. Yet other sources of delay could be due to data interleaving that may have been performed during transmission. Embodiments of the present disclosure also recognize that recipient device components may also impact delay. Devices, such as computers, with larger memories and faster processing abilities may have less delay than other devices, such as set-top boxes, with smaller memories and slower processing abilities.

Embodiments of the present disclosure recognize that, in certain environments, such as broadcast environments, it is important to have a fixed end-to-end delay that each transmitted packet experiences the same delay across a point-to-multipoint transmission system from transmission until leaving the MMT processing stack at the receiving entity. For example, embodiments of the present disclosure recognize that it is important to provide or guarantee that all clients receiving the same program present the same content at the same time agnostic to device, protocol, or transmission media implementation. In addition, in order to enable hardware realization of receivers, embodiments of the present disclosure recognize that an upper bound on the required memory space to ensure the fixed packet delivery delay may need to be provided. Depending on the nature of the network and the setup of the service, MMT packets may be exposed to a wide range of jitter, which would then result in different buffer requirements. For example, a service that offers FEC protection on large source blocks and which is carried over the Internet may require more buffering than a service that is carried over a managed broadcast and without FEC protection.

Accordingly, embodiments of the present disclosure provide a method and apparatus to provide, enforce, and/or ensure a fixed end-to-end delay and limited memory requirement for buffering of incoming MMT packets. Embodiments of the present disclosure also provide tools to signal the buffer requirement and the fixed delay to the receiving entities.

Figure 1:
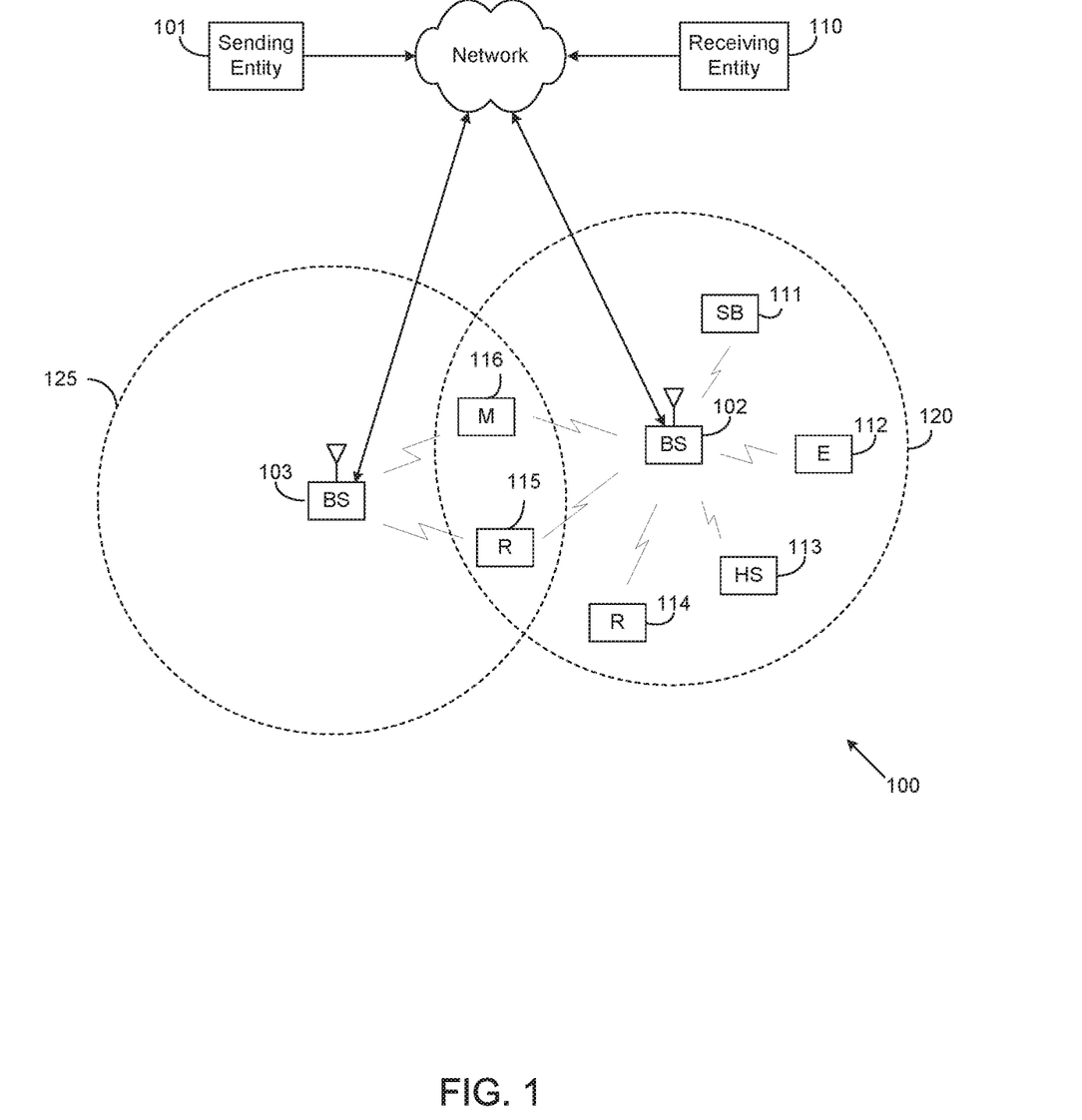
FIG. 1 illustrates an example of a transmission system in which various embodiments of the present disclosure may be implemented.

FIG. 1 illustrates an example of a transmission system 100 in which various embodiments of the present disclosure may be implemented. In the illustrated embodiment, the system 100 includes a sending entity 101, a network 105, receiving entities 110-116, wireless transmission points (e.g., an Evolved Node B (eNB), Node B), such as base station (BS) 102, base station (BS) 103, and other similar base stations or relay stations (not shown). Sending entity 101 is in communication with base station 102 and base station 103 via network 105 which may be, for example, the Internet, a media broadcast network, or IP-based communication system. Receiving entities 110-116 are in communication with sending entity 101 via network 105 and/or base stations 102 and 103.

Base station 102 provides wireless access to network 105 to a first plurality of receiving entities (e.g., user equipment, mobile phone, mobile station, subscriber station) within coverage area 120 of base station 102. The first plurality of receiving entities includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless communication enabled laptop, a wireless communication enabled PDA, a tablet computer, or the like.

Base station 103 provides wireless access to network 105 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that system 100 may provide wireless broadband and network access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via network 105. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

Figure 2:
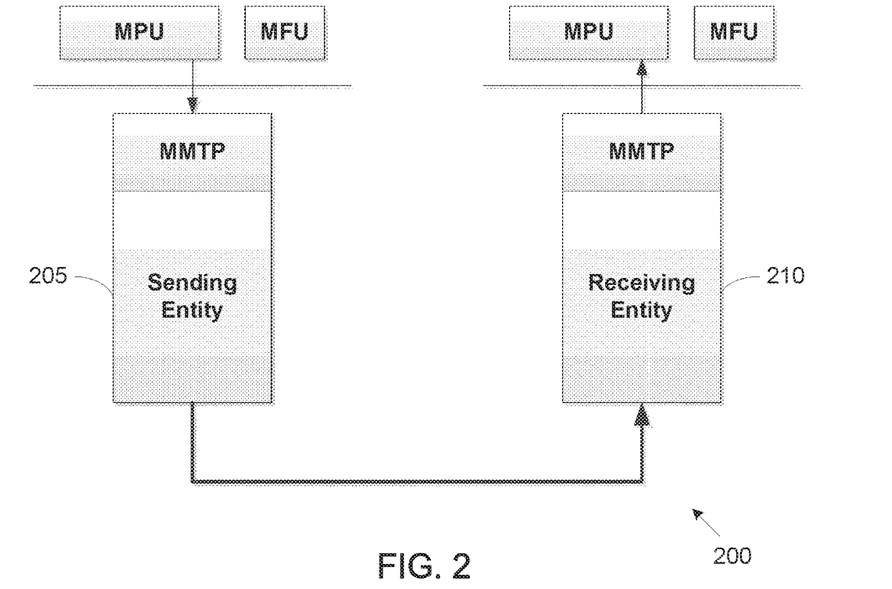
FIG. 2 illustrates a block diagram of MMT protocol input/output in an MMT media data transmission environment in accordance with various embodiments of the present disclosure.

FIG. 2 illustrates a block diagram of MMT protocol input/output in an MMT media data transmission environment 200 in accordance with various embodiments of the present disclosure. In this illustrative example, a sending entity 205 sends media data over a transmission medium to a receiving entity 210 according to MMTP. The media data 215 is processed at the sending entity 205 according to MMTP. For example, the sending entity 205 may perform MMT package encapsulation, coding, delivery, and signaling for the media data as MMT processing units (MPUs) and MMT fragmentation units (MFUs) 215 (e.g., fragments of an MPU). The processed media data is then sent (e.g., as packets) to the receiving entity 210 for processing (e.g., de-capsulation, decoding, etc.) according to MMTP. The media data processed at the receiving entity 210 is then passed up to an upper layer programming (e.g., an application layer program, such as a media player) as MPUs and/or MFUs for presentation to a user completing delivery of the media data.

Figure 3:
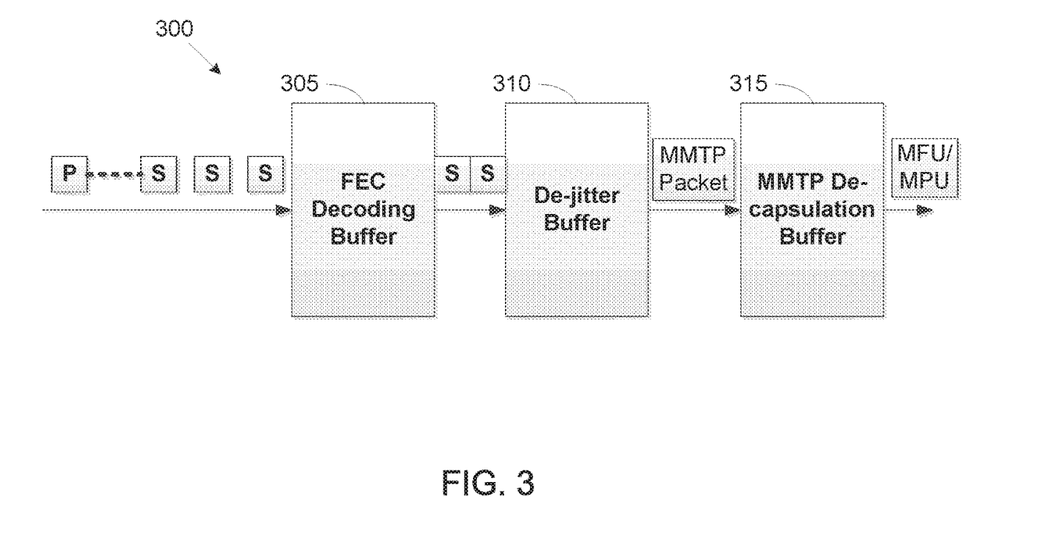
FIG. 3 illustrates a block diagram of a receiver buffer model for simulating the receiver behavior at the sender side and for estimating a buffer delay and size requirement in accordance with various embodiments of the present disclosure.

FIG. 3 illustrates a block diagram of a receiver buffer model 300 for simulating the receiver behavior at the sender side and for estimating a buffer delay and size requirement in accordance with various embodiments of the present disclosure. In various embodiments of the present disclosure, a sending entity 205, such as a media-delivery server (or other MMT aware node), calculates, determines, and/or identifies a fixed end-to-end delay for media data delivery in the point-to-multipoint transmission system. For example, the sending entity 205 may utilize model 300 to determine effects of media data processing performed on the packet stream on reception constraints in a receiver of a receiving entity 210. For example, the sending entity 205 may utilize the model to determine a required buffering delay and a required buffer size and communicate this information to entities receiving the media data.

In this illustrative example, the FEC decoding buffer 305 is a model for estimating a delay and/or buffer size requirement associated with FEC decoding. FEC decoding is typical for many applications, where lower layer transmission may not be sufficient to recover from channel errors or when network congestion may cause packet drops or excessive delays. To perform FEC decoding, the receiving entity 210 uses a buffer where incoming packets are stored until sufficient source ("S") and repair data ("P" parity data) is available to perform FEC decoding.

In this illustrative example, the sending entity 205 uses the model of the FEC decoding buffer 305 to determine actions that the receiving entity 210 would take regarding FEC decoding to estimate the delay associated with FEC decoding. In other words, the sending entity 205 uses the model of the FEC decoding buffer 305 to predict actions taken by the receiving entity 210 to estimate FEC decoding delay. This modeling of the FEC decoding buffer 305 by the sending entity 205 starts with the FEC decoding buffer 305 being assumed to be initially empty. Next, for each incoming packet i with transmission timestamp $t_s$, the receiving entity 210 buffers the packet i using the FEC decoding buffer 305, if buffer_occupancy+packet_size<max_buffer_size. Otherwise, the receiving entity 210 discards packet i as being non-conformant with the buffer model. The receiving entity 210 then determines if FEC is applied to packet i. If FEC is applied to packet i, the receiving entity 210 determines source block j to which packet i belongs, determine the insertion time t of a first packet of source block j, at time t+FEC_buffer_time moves all packets (after FEC correction, if needed) of source block j to the de-jitter buffer, and discards the repair packets. The sending entity 205 utilizes the FEC_buffer_time as the required buffer time for FEC decoding from the reception of the first packet of a source block and until FEC decoding is attempted. This time is typically calculated based on the FEC block size.

The de-jitter buffer 310 is a model used by the sending entity to estimate a delay and/or buffer size requirement associated with de-jittering of packets, i.e. removal of the delay jitter of packets. The de-jitter buffer ultimately ensures that MMTP packets experience a fixed transmission delay from source to the output of the MMTP protocol stack, assuming a maximum transmission delay. The receiving entity 210 may discard data units that experience a transmission delay larger than the maximum transmission delay as being very late.

This modeling of the de-jitter buffer 310 by the sending entity 205 starts with the de-jitter buffer being assumed to be initially empty. The receiving entity 210 then inserts an MMTP packet in the de-jitter buffer 310 as the packet arrives. The receiving entity 210 then removes the MMTP packet at time $t_s+\Delta$, where $t_s$ is the transmission timestamp of the MMTP packet and $\Delta$ is the fixed end-to-end delay that is signaled for the media data. After the de-jittering is applied, all MMTP packets that arrived correctly (or were recovered through FEC/retransmissions) will have experienced the same end-to-end delay.

The MMTP de-capsulation buffer 315 is a model used by the sending entity to estimate a delay and/or buffer size requirement associated with MMTP processing before passing the output to the upper layers. The output of the MMTP processor may either be the MFU payload (in low-delay operation), a complete movie fragment, or a complete MPU. MPUs may be fragmented into smaller packets or aggregated into larger packets, depending on their size. The de-capsulation (removal of the MMTP packet and payload headers) and any required de-fragmentation/de-aggregation of the packets is then performed as part of the MMTP processing. This procedure may require some buffering delay, called de-capsulation delay, to perform assembly when an MPU is fragmented into multiple MMTP packets. However, in this illustrative embodiment, de-capsulation delay may not be considered as part of the fixed end-to-end delay, and the availability of an MPU for consumption by the coded media layer can be guaranteed by the entity fragmenting the MPU into multiple MMTP packets, regardless of the de-capsulation delay.

Figure 4:
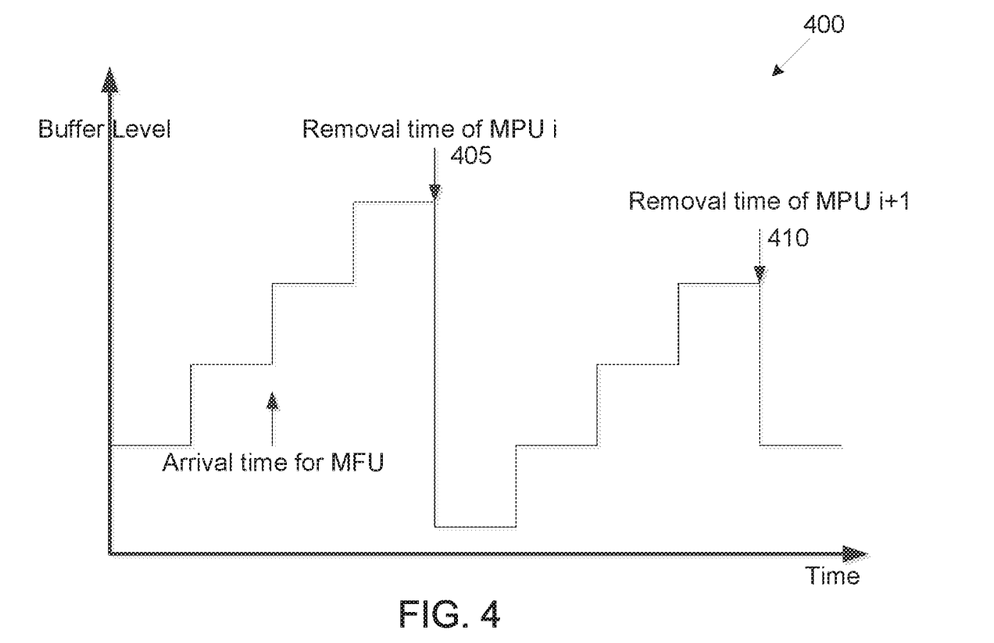
FIG. 4 illustrates a timing diagram for MMTP packet processing in the MMTP de-capsulation buffer of FIG. 3 in accordance with various embodiments of the present disclosure.

FIG. 4 illustrates a timing diagram 400 for MMTP packet processing in the MMTP de-capsulation buffer 315 in accordance with various embodiments of the present disclosure. The timing diagram 400 is an example of a buffer level in the MMTP de-capsulation buffer 315 over time as MMTP packets are processed and output to upper layers. For example, the timing diagram 400 is an illustration of estimating the buffer requirement associated with MMTP packet processing.

The modeling of the MMTP de-capsulation buffer 315 by the sending entity 205 starts with the MMTP de-capsulation buffer assumed as initially empty. The receiving entity 210 inserts an MMTP packet into the MMTP de-capsulation buffer 315 after the de-jittering is performed. For MMTP packets carrying aggregated payload, the receiving entity 210 removes the packet and payload header and splits the aggregate into separate MPUs. For MMTP packets carrying fragmented payload, the receiving entity 210 keeps the packet in the MMTP de-capsulation buffer 315 until all corresponding fragments are received correctly or until a packet is received that does not belong to the same fragmented MPU. If all fragments of an MPU are received (e.g., at time 405 or time 410), the receiving entity 210 removes the MMTP packet and payload header, reassembles, and forwards the reconstructed MPU to the upper layer. Otherwise, if some fragments of the MPU are not received, the receiving entity 210 may discard fragments of the non-complete MPU.

Based on this receiver buffer model 300, the sending entity 205 is able to determine the transmission schedule, the buffer size and the buffering delay $\Delta$, reduce and/or ensure that no packets are dropped, assuming a maximum delivery delay in the target path. The sending entity 205 provides and/or guarantees packets that experience a transmission delay below a set threshold will be output to the upper layer after a constant delay across the point-to-multipoint transmission system and without causing the client buffer to underflow or overflow.

After determining the required buffer size and the fixed end-to-end delay for the media data, the sending entity 205 communicates this information to the receiving entity 210. For example, the sending entity 205 may communicate this information to the receiving entity 210 using a signaling protocol between the sending and receiving entities. In various embodiments, the sending entity 205 may continuously run the receiver buffer model 300 to verify that the selected end-to-end delay and buffer size are aligned and do not cause buffer under-runs or overruns. At the receiver side, the signaling of the fixed delay instructs the receiving entity 210 to perform buffering so that each data unit experiences the signaled fixed end-to-end delay $\Delta$ before the data unit is forwarded to upper layers. Under the assumption that clocks between the sending and receiving entities are synchronized, the receiving entity 210 can calculate the output time of the data based on the transmission timestamp and the signaled fixed end-to-end delay.

In some embodiments, sending entity 205 performs the signaling using a session description file, such as a session description protocol (SDP) file. In an SDP, a media session is described that is delivered using the MMTP protocol. The media session includes the fixed end-to-end delay and/or the required buffer size. Table 1 below illustrates one example of a media session description of an SDP file that signals the fixed end-to-end delay and the buffer size requirement.

Table 1:
m=asset 23442 UDP/MMTP 1
a=assetid: 1 MP4
a=min-buffer-size: 1000000
a=end-to-end-delay: 2500

In another embodiment, the signaling of the fixed end-to-end delay and the buffer size requirement is performed using the MMTP Signaling Function. In such embodiment, a new signaling message is devised to carry the above information.

In this example, the buffer size is given in bytes, and the fixed end-to-end delay is given in milliseconds. In other embodiments, sending entity 205 may perform the signaling using MMTP signaling messages, where either a special signaling message type is defined or the information is included in an existing signaling message.

In determining the fixed delay, the sending entity 205 estimates the maximum expected and tolerable transmission delay in the transmission path down to the receivers. If FEC is in use, the sending entity 205 adds an FEC buffering delay that covers for the time needed to assemble a source block (e.g., FEC_buffer_time discussed above), in the situation that FEC decoding is required to recover lost MMTP packets. Additionally, the sending entity 205 adds any delays that might be incurred by fragmentation of packets. The sending entity 205 signals the resulting estimation of the MMTP delivery delay as the fixed end-to-end delay. One example of estimating the fixed end-to-end delay is provided by Equation 1 below:

$$\text{fixed end-to-end delay} = \text{maximum transmission delay} + \text{FEC\_buffer\_time} \quad \text{[Equation 1]}$$

In various embodiments, to estimate the resulting buffer requirement, the sending entity 205 may use the fixed end-to-end delay and subtract the minimum transmission delay for the transmission path down to the receiver as an estimated maximum amount of time that the data would need to be buffered by the sending entity 205. The sending entity 205 may then estimate the buffer size requirement as the maximum bitrate of the MMTP stream multiplied by the calculated buffered data duration. One example of estimating the fixed end-to-end delay is provided by Equation 2 below:

$$\text{buffer size} = (\text{maximum delay} - \text{minimum delay}) * \text{maximum bitrate} \quad \text{[Equation 2]}$$

While various embodiments described herein discuss MMT data communication, it is noted that the various embodiments of the present disclosure are not limited to MMT communications. For example, the fixed delay and buffer size determinations may be applied to any suitable type of data or media content delivery and/or any suitable type of transmission system in accordance with the principals of the present disclosure.

Figure 5:
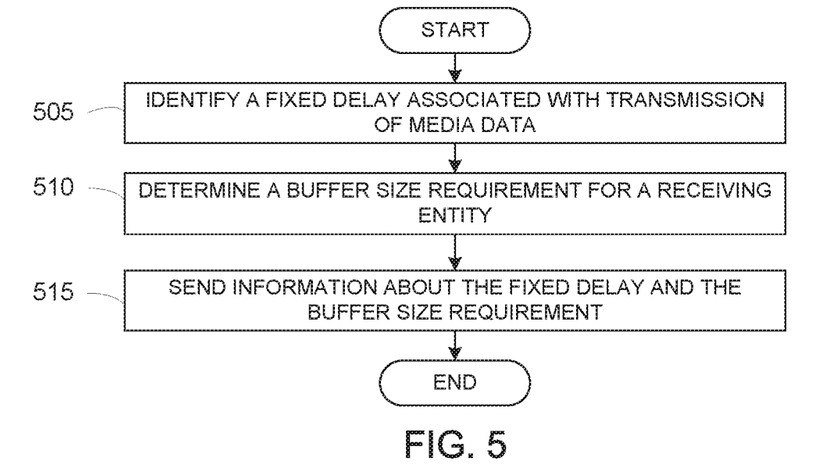
FIG. 5 illustrates a process for operating a sending entity in a transmission system in accordance with an illustrative embodiment of the present disclosure.

FIG. 5 illustrates a process for operating a sending entity in a transmission system in accordance with an illustrative embodiment of the present disclosure. For example, the process depicted in FIG. 5 may be performed by the sending entity 205 in FIG. 2. The process may also be implemented by the sending entity 101 in FIG. 1.

The process begins with the sending entity identifying a fixed delay associated with transmission of media data (step 505). For example, in step 505, the sending entity may be a media server in a point-to-multipoint transmission system that delivers time-sensitive content to a variety of devices and over a variety of communication mediums. To identify this delay, the sending entity may estimate the delay or identify a pre-calculated or standardized delay from another source. In one example, the sending entity may estimate a transmission delay associated with a transmission path (e.g., wireless, Ethernet, satellite broadcast, etc.) from the sending entity to one or more receiving entities in the multi-point transmission system. For example, the transmission delay may be an estimate of a maximum transmission delay based on transmission media and device types associated with each of the receiving entities in the multi-point transmission system. The sending entity may also estimate a buffering delay associated with processing received packets for the media data in the receiving entity. The sending entity may then calculate the fixed delay based on the transmission delay and the buffering delay.

The sending entity then determines a buffer size requirement for a receiving entity (step 510). For example, in step 510, the sending entity may determine the expected amount of time that the data needs to be buffered by the receiving entity as the fixed delay minus the minimum transmission delay. The sending entity may then calculate the buffer size requirement based on this amount of buffering time and a bitrate associated with the media data.

Thereafter, the sending entity sends information about the fixed delay and the buffer size requirement (step 515). For example, in step 515, the sending entity may signal the buffer size requirement in a message separate from sending the media data or in metadata preceding or accompanying the transmission of the media data. In these examples, the fixed delay is a requirement of a length of time after transmission that the media data is presented to a user of a receiving entity. In other words, the fixed delay is a time after which the sending entity is permitted to pass the media data up to an upper layer program for the ultimate presentation of the media data to the user. In these examples, the sending entity provides and/or ensures that media data is displayed at about the exact same time regardless of transmission media or recipient device type among the multiple recipient devices that may be present in a point-to-multipoint transmission environment.

Figure 6:
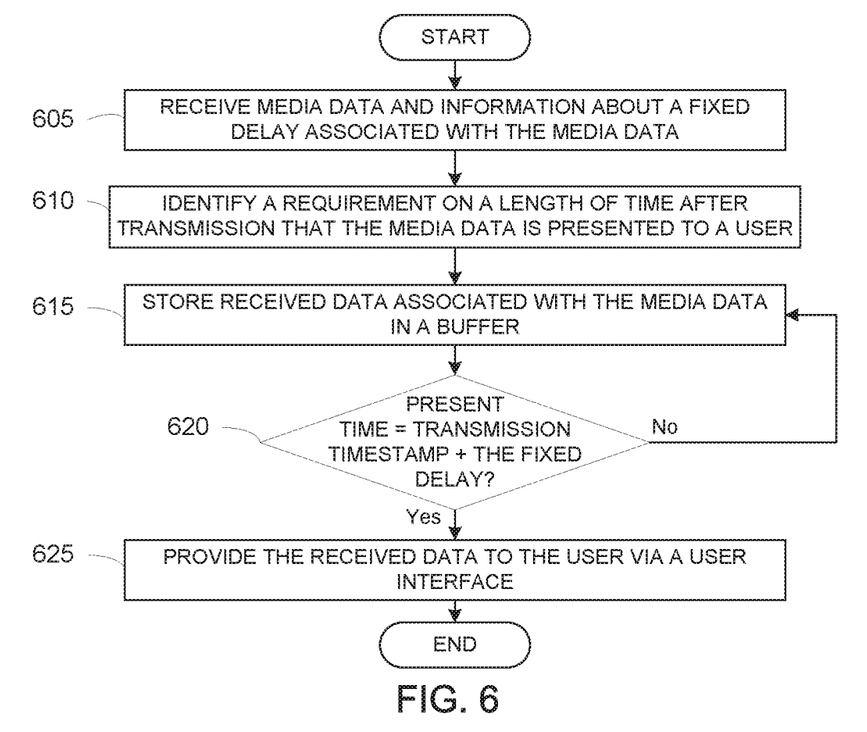
FIG. 6 illustrates a process for operating a receiving entity in a transmission system in accordance with an illustrative embodiment of the present disclosure.

FIG. 6 illustrates a process for operating a receiving entity in a transmission system in accordance with an illustrative embodiment of the present disclosure. For example, the process depicted in FIG. 6 may be performed by the receiving entity 210 in FIG. 2. The process may also be implemented by the receiving entity 110 in FIG. 1.

The process begins with the receiving entity receiving media data and information about a fixed delay associated with the media data (step 605). For example, in step 605, the receiving entity may receive this information with or in advance of the media data.

The receiving entity then identifies a requirement on a length of time after transmission that the media data is presented to a user (step 610). For example, in step 610, the receiving entity may use the fixed delay as a length of time to determine when to pass received media data to an upper layer for ultimate presentation to the user.

Thereafter, the receiving entity stores received data associated with the media data in a buffer (step 615). For example, in step 615, the receiving entity may store the media data upon receipt until a time from a transmission timestamp associated with the received data plus the fixed delay has elapsed. The receiving entity then determines whether a present time is the transmission timestamp plus the fixed delay (step 620). If the present time is less than the transmission timestamp plus the fixed delay, the sending entity continues to buffer the media data for later presentation and delivery. If the present time is greater than the transmission timestamp plus the fixed delay, the sending entity may discard the data as being received too late.

If, however, the present time is the transmission timestamp plus the fixed delay, the receiving entity provides the received data to the user via a user interface (step 625), with the process terminating thereafter. For example, in step 625, the receiving entity may pass the media data to an application layer program for presentation of the media data to the user. In these examples, the receiving entity identifies and complies with the fixed delay for the media data to ensure that media data is displayed at the receiving entity at about the exact same time among the other receiving entities that may be present in a point-to-multipoint transmission environment.

Although FIGS. 5 and 6 illustrate examples of processes for sending and receiving entities in a transmission system, respectively, various changes could be made to FIGS. 5 and 6. For example, while shown as a series of steps, various steps in each figure could overlap, occur in parallel, occur in a different order, or occur multiple times.

Figure 7:
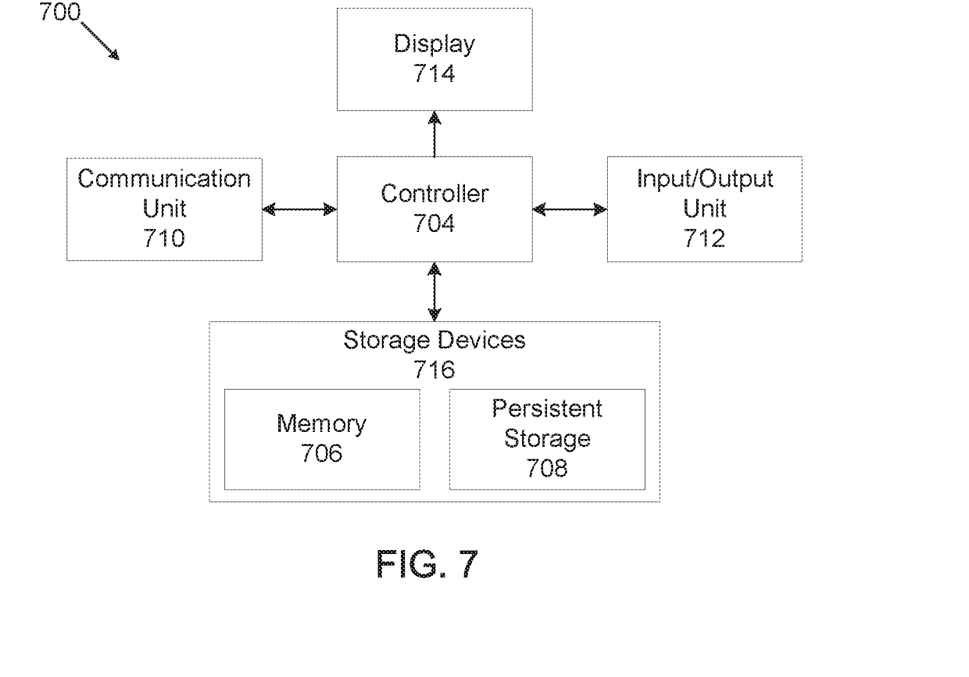
FIG. 7 illustrates an example electronic device in which various embodiments of the present disclosure may be implemented.

FIG. 7 illustrates an example electronic device 700 in which various embodiments of the present disclosure may be implemented. In this example, the electronic device 700 includes a controller 704, a memory 706, a persistent storage 708, a communication unit 710, an input/output (I/O) unit 712, and a display 714. In these illustrative examples, electronic device 700 is an example of one implementation of the sending entity 101 and/or the receiving entities 110-116 in FIG. 1. Electronic device 700 is also one example of the sending entity 205 and/or the receiving entity 210 in FIG. 2.

Controller 704 is any device, system, or part thereof that controls at least one operation. Such a device may be implemented in hardware, firmware, or software, or some combination of at least two of the same. For example, the controller 704 may include a hardware processing unit and/or software program configured to control operations of the electronic device 700. For example, controller 704 processes instructions for software that may be loaded into memory 706. Controller 704 may include a number of processors, a multi-processor core, or some other type of processor, depending on the particular implementation. Further, controller 704 may be implemented using a number of heterogeneous processor systems in which a main processor is present with secondary processors on a single chip. As another illustrative example, controller 704 may include a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Memory 706, in these examples, may be, for example, a random access memory or any other suitable volatile or non-volatile storage device. For example, persistent storage 708 may contain one or more components or devices. Persistent storage 708 may be a hard drive, a flash memory, an optical disk, or some combination of the above. The media used by persistent storage 708 also may be removable. For example, a removable hard drive may be used for persistent storage 708.

Communication unit 710 provides for communications with other data processing systems or devices. In these examples, communication unit 710 may include a wireless (cellular, WiFi, etc.) transmitter, receiver and/or transmitter, a network interface card, and/or any other suitable hardware for sending and/or receiving communications over a physical or wireless communications medium. Communication unit 710 may provide communications through the use of either or both physical and wireless communications links.

Input/output unit 712 allows for input and output of data with other devices that may be connected to or a part of the electronic device 700. For example, input/output unit 712 may include a touch panel to receive touch user inputs, a microphone to receive audio inputs, a speaker to provide audio outputs, and/or a motor to provide haptic outputs. Input/output unit 712 is one example of a user interface for providing and delivering media data (e.g., audio data) to a user of the electronic device 700. In another example, input/output unit 712 may provide a connection for user input through a keyboard, a mouse, external speaker, external microphone, and/or some other suitable input/output device. Further, input/output unit 712 may send output to a printer. Display 714 provides a mechanism to display information to a user and is one example of a user interface for providing and delivering media data (e.g., image and/or video data) to a user of the electronic device 700.

Program code for an operating system, applications, or other programs may be located in storage devices 716, which are in communication with the controller 704. In some embodiments, the program code is in a functional form on the persistent storage 708. These instructions may be loaded into memory 706 for processing by controller 704. The processes of the different embodiments may be performed by controller 704 using computer-implemented instructions, which may be located in memory 706. For example, controller 704 may perform processes for one or more of the modules and/or devices described above.

In some embodiments, various functions described above are implemented or supported by a computer program product that is formed from computer-readable program code and that is embodied in a computer-readable medium. Program code for the computer program product may be located in a functional form on a computer-readable storage device that is selectively removable and may be loaded onto or transferred to electronic device 700 for processing by controller 704. In some illustrative embodiments, the program code may be downloaded over a network to persistent storage 708 from another device or data processing system for use within electronic device 700. For instance, program code stored in a computer-readable storage medium in a server data processing system may be downloaded over a network from the server to electronic device 700. The data processing system providing program code may be a server computer, a client computer, or some other device capable of storing and transmitting program code.

Embodiments of the present disclosure recognize that MMTP has been developed to improve upon and replace existing transport protocols by providing a generic protocol, suitable for the delivery of media data. MMTP addresses delay tolerant applications as well as real-time low-delay applications, such as live streaming. In order to ensure that the MMTP protocol operates consistently across receivers and that the needed buffer space is made available by the clients, embodiments of the present disclosure provide methods and apparatuses to determine the end-to-end delay, to estimate the required buffer space, and signal this information to the receiver. This functionality is especially important for broadcast receivers where the receiving client is implemented in hardware (e.g. a set-top box).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a sending entity in a transmission system, the method comprising:
   identifying a buffer size requirement and a fixed delay; and
   sending, to a receiving entity in the transmission system, at least one packet for media data, information on the fixed delay and information on the buffer size requirement for delivering the at least one packet to an upper layer of the receiving entity,
   wherein the buffer size requirement is estimated based on:
      a maximum bitrate related to the at least one packet, and
      a difference between a maximum transmission delay and a minimum transmission delay, and
   wherein the fixed delay is calculated based on a sum of a forward error correcting (FEC) buffering delay and the maximum transmission delay, if FEC is applied to the at least one packet.

2. The method of claim 1, wherein each of the at least one packet further includes information on a transmission timestamp, and
   wherein one or more packets among the at least one packet are removed from a de-jitter buffer of the receiving entity at time corresponding to a sum of the transmission timestamp and the fixed delay.

3. A method of operating a receiving entity in a transmission system, the method comprising:
   receiving, from a sending entity in the transmission system, at least one packet for media data, information on a fixed delay and information on a buffer size requirement for delivering the at least one packet to an upper layer of the receiving entity; and
   identifying the fixed delay and the buffer size requirement,
   wherein the buffer size requirement is estimated based on:
      a maximum bitrate related to the at least one packet, and
      a difference between a minimum transmission delay and a maximum transmission delay, and wherein the fixed delay is calculated based on a sum of a forward error correcting (FEC) buffering delay and the maximum transmission delay, if FEC is applied to the at least one packet.

4. The method of claim 3, wherein each of the at least one packet further includes information on a transmission timestamp, and wherein one or more packets among the at least one packet are removed from a de jitter buffer of the receiving entity at time corresponding to a sum of the transmission timestamp and the fixed delay.

\* \* \* \* \*